(12) United States Patent
Lamport et al.

(10) Patent No.: US 7,260,611 B2
(45) Date of Patent: Aug. 21, 2007

(54) MULTI-LEADER DISTRIBUTED SYSTEM

(75) Inventors: Leslie Lamport, Palo Alto, CA (US);
Aamer Hydrie, Seattle, WA (US);
Demetrios Achlioptas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 796 days.

(21) Appl. No.: 10/302,572

(22) Filed: Nov. 21, 2002

(65) Prior Publication Data

US 2004/0103138 A1    May 27, 2004

(51) Int. Cl.
*G06F 15/16* (2006.01)
*G06F 11/00* (2006.01)
*G06F 12/00* (2006.01)

(52) U.S. Cl. .................. 709/208; 370/229; 370/230
(58) Field of Classification Search ............... 709/208; 370/229, 230
See application file for complete search history.

(56) References Cited

U.S. PATENT DOCUMENTS

| | | | |
|---|---|---|---|
| 5,339,405 A * | 8/1994 | Elko et al. ............... | 714/56 |
| 6,374,285 B1 | 4/2002 | Scales et al. .............. | 709/104 |
| 6,381,627 B1 * | 4/2002 | Kwan et al. ............... | 709/201 |
| 6,507,863 B2 * | 1/2003 | Novaes .................... | 709/201 |
| 6,744,771 B1 * | 6/2004 | Barber et al. ............. | 709/208 |
| 6,804,512 B1 * | 10/2004 | Baker et al. .............. | 455/423 |
| 6,813,635 B1 * | 11/2004 | Jorgenson ................. | 709/225 |
| 6,944,187 B1 * | 9/2005 | Driediger et al. .......... | 370/503 |
| 6,993,587 B1 * | 1/2006 | Basani et al. ............. | 709/229 |
| 2002/0023186 A1 * | 2/2002 | Kim ....................... | 710/244 |
| 2003/0233538 A1 * | 12/2003 | Dutertre .................. | 713/151 |

OTHER PUBLICATIONS

Lamport, L., "Time, Clocks, and the Ordering of Events in a Distributed System," *Comm. of the ACM*, Jul. 1978, 21(7), 558-565.
Lamport, L., "How to Make a Multiprocessor Computer that Correctly Executes Multiprocess Programs," *IEEE Trans. on Computers*, Sep. 1979, C-28(9), 690-691.
Plakal, M. et al., "Lamport clocks: verifying a directory cache-coherence protocol," *ACM Symposium on Parallel Algorithms and Architectures: Proceedings of the Tenth Annual ACM Symposium on Parallel Algorithms and Architectures*, Puerto Vallarta, Mexico, 1998, 67-76.

* cited by examiner

*Primary Examiner*—Khanh Dinh
*Assistant Examiner*—Hassan Phillips
(74) *Attorney, Agent, or Firm*—Woodcock Washburn LLP

(57) ABSTRACT

New information is introduced to a distributed system at many places. The information impacts data that is replicated throughout the system. The replicas of the data must be synchronized so that changes to the system are accurately reflected. One solution to the synchronized replica problem is a state machine approach. In such an approach, the computers of the network each maintain their own data, which is kept in the same state as the data of the other computers by processing the identical commands in the identical order. To ensure that all commands are executed in the same order, a lead process is given the task of assigning command sequence numbers. However, using a single lead process introduces a bottleneck in the distributed system by requiring that all commands to change data go through the lead process to be assigned an execution order. The invention divides the command ordering among multiple lead processes. Each lead process assigns command sequence numbers that are ordered with respect to other lead process but which do not conflict with the command sequence numbers assigned by the other leader processes.

23 Claims, 6 Drawing Sheets

MULTI-LEADER DISTRIBUTED SYSTEM

TECHNICAL FIELD

The invention relates generally to distributed computing and more particularly to lead processes in distributed computer systems.

BACKGROUND OF THE INVENTION

As computing devices become more powerful, containing increased storage capacity and processing capabilities, the average user consumes an increasingly smaller percentage of those resources in performing everyday tasks. Thus, many of today's personal computing devices are often not used to their full potential because their computing abilities greatly exceed the demands most user's place upon them. An increasingly popular method of deriving use and value from the unused resources of powerful computing devices is a distributed computing system in which the computing devices act in coordination with one another to perform tasks and maintain data.

A distributed computing system can utilize a number of interconnected computing devices to achieve the performance and storage capabilities of a larger, more expensive computing device. Thus, while each computing device may have only a few gigabytes of useable storage space, a distributed computing system comprising a number of such devices can aggregate the available storage space on each individual device and present to a user a terabyte or more of usable storage space. Similarly, a distributed computing system can present to a user a large amount of useable processing power by dividing the user's tasks into smaller segments and transmitting the segments to the individual devices for processing in parallel.

Alternatively, a distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multinational corporation can establish a world-wide distributed computing system. Such a corporation might use a number of high performance server computing devices, rather than less powerful personal computing devices because each individual computing device would be required to service many users within that geographic region. The individual high performance devices can each perform identical tasks and store identical data, allowing users who merely seek to access the data to obtain such access from a high performance device located in a convenient location for that user.

However, distributed computing systems can be difficult to maintain due to the complexity of properly synchronizing the individual devices that comprise the system. Because time-keeping across individual process can be difficult at best, a state machine approach is often used to coordinate activity among the individual devices. A state machine can be described by a set of states, a set of commands, a set of responses, and functions that link each response/state pair. A state machine can execute a command by changing its state and producing a response. Thus, a state machine can be completely described by its current state and the actions it is about to perform, removing the need to use precise physical time-keeping.

The current state of a machine is, therefore, dependent upon its previous state, the commands performed since then, and the order in which those commands were performed. To maintain synchronization between two or more state machines, a common initial state can be established, and each state machine can, beginning with the initial state, execute identical commands in the identical order. Therefore, to synchronize one state machine to another, a determination of the order of commands performed by the other state machine needs to be made. The problem of synchronization, therefore, becomes a problem of determining the order of the commands performed, or, more specifically, determining its particular command performed for a given step. In this way, the synchronization problem reduces to one of ordering events and becomes abstracted from the notion of physical time.

One way to ensure that the commands are executed in the same sequence is to appoint a lead process ("leader") charged with the task of assigning a command sequence number to each command. New commands are passed to the leader. The leader generates a series of commands, assigns sequence numbers, and sends the sequenced commands to the other computers. All state machines are programmed to execute commands in their assigned order. Regardless of when commands arrive at any given machine, they will be executed in the same sequence. If a later-numbered command arrives first, a state machine will simply store it until the previous commands arrive, and then execute all commands in sequence.

One problem with the state-machine approach to synchronizing data is potential informational bottleneck at the lead server. Because command sequence numbers must be assigned before the commands are executed, all new information must flow into the leader to be divided into a set of sequenced commands. All sequenced commands then flow out of the leader to the state machines of the network. There is a need for a state-machine approach to data synchronization that is capable of assigning command sequence numbers that overcomes the informational bottleneck at the leader.

SUMMARY OF THE INVENTION

A distributed computer system uses multiple lead servers for the task of assigning command sequence numbers. By using multiple leaders, a potential processing bottleneck at a single lead process is reduced. To avoid the use of the same number by different leaders, a function is assigned to each lead process that allows that lead process to assign command sequence numbers that are ordered and different with respect to command sequence numbers that are assigned by other leader processes. For example, a first lead process could assign command sequence numbers according to an odd number function, i.e. 1, 3, 5, 7, etc., while a second lead server would assign command sequence numbers according to an even number function, i.e. 2, 4, 6, 8, etc. In this way, both lead processes assign command sequence numbers that can be ordered by other processes in the distributed system. Other suitable functions that assign command sequence can be used such as various multiples or various segments of numbers. Moreover, the lead processes do not have to assign the same number of sequence numbers. One lead process may, for example, assign two sequence numbers and another lead process assign every third command sequence number.

BRIEF DESCRIPTION OF THE DRAWINGS

The apparatus and methods for measuring distortion in amplifiers in accordance with aspects of the invention are further described with reference to the accompanying drawings in which.

DETAILED DESCRIPTION OF THE INVENTION

Overview

Figure 1:
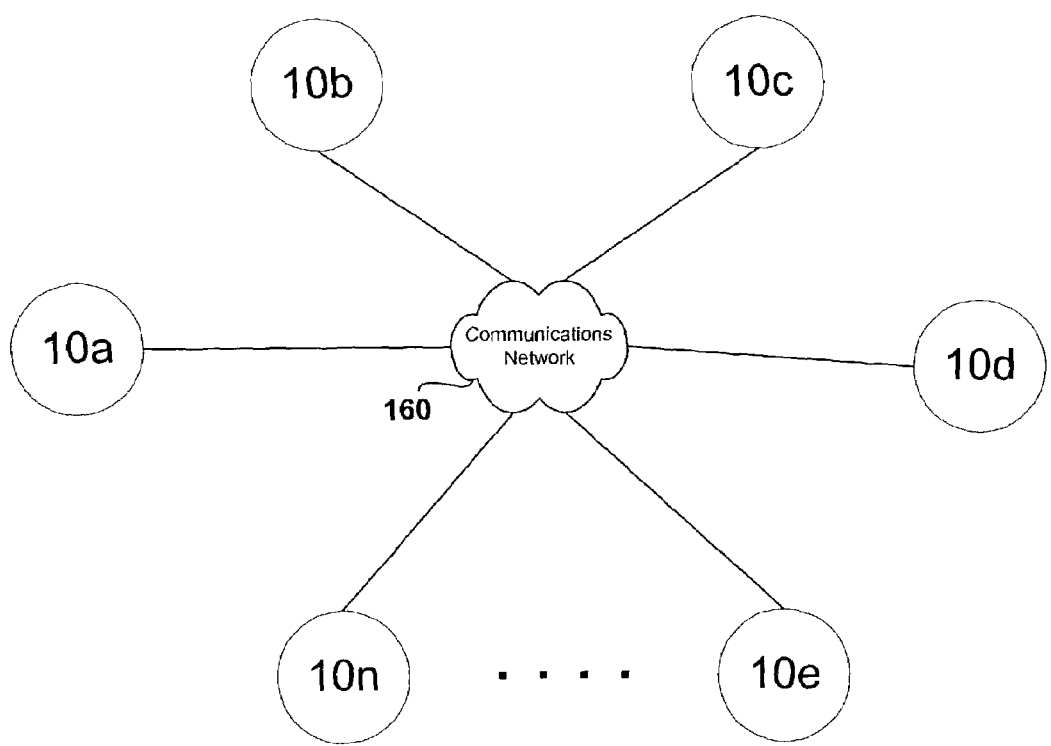
FIG. 1 is schematic diagram of a distributed computing environment.

A distributed computing system can be comprised of a number of individual computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server device that can act as a central storage repository for various forms of information, such as a central database. Such a distributed system seeks to replicate the central store on all of its constituent devices so that every client seeking to communicate with the central storage can find a convenient and efficient device with which to communicate.

The distributed computing system can be thought of as a state machine, with the future state of the machine completely defined by the current state and the action to be taken. Each constituent device of the distributed computing system can then independently execute the state machine of the overall system. The state-machine approach can be implemented asynchronously such that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of all of the functions that were executed. In such a manner, every device can have the same state and if a device fails it need only determine the last function it executed, identify, from the list, any functions that have been agreed upon since that last function, and execute those functions.

Such a distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, more clients can be serviced in parallel increasing the throughput of the overall system, and the server as a whole is far less prone to failure due to the increased redundancy.

Distributed computing facilitates sharing of computer resources and services by exchange between computing devices and systems. These resources and services include the exchange of information, cache storage, and disk storage for files. Distributed computing takes advantage of network connectivity, allowing computing devices to leverage their collective power to benefit the entire enterprise.

FIG. 1 provides a schematic diagram of a distributed computing environment. The distributed computing environment comprises computing processes 10A-10n. These objects may comprise programs, methods, data stores, programmable logic, etc. The objects comprise portions of the same or different devices such as servers, personal computers, dedicated computing devices, etc. Each process can communicate with another process by way of a communications network 160. This network may itself comprise other computing objects and computing devices that provide services to the system of FIG. 1. In accordance with an aspect of the invention each process 10a-10n may contain services and data that would provide benefits to other of the processes 10a-10n.

Distributed computing can help businesses deliver services and capabilities more efficiently across diverse geographic boundaries. Moreover, distributed computing can move data closer to the point at which it is actually consumed acting as a network caching mechanism. Distributed computing also allows computing networks to dynamically work together.

Generally speaking, the distributed computing environment provides (1) the ability to make the entire range of computing devices work together and to have user information automatically updated and synchronized on all of them, (2) increased interactive and interoperative capability for network computers, (3) online services that feature customized access and delivery of products and services to the user from a central starting point for the management of various applications.

Computing Environment

Figure 2:
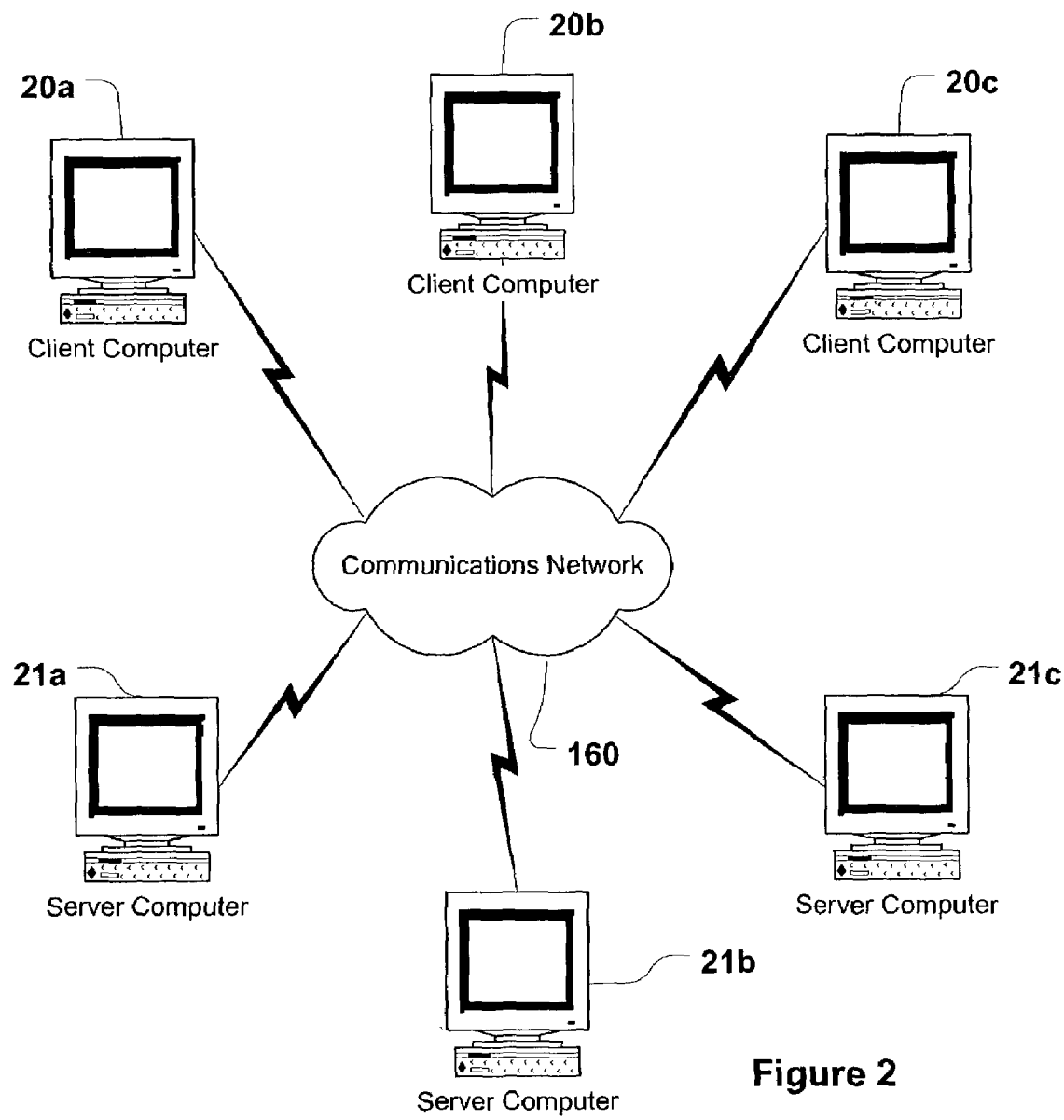
FIG. 2 is an illustration of the implementation of FIG. 1 in a physical environment.

FIG. 2 illustrates how the objects of FIG. 1 may be implemented in a physical environment. Here computers 20a-20c and 21a-21c may host various ones of the processes of FIG. 1. Although the physical environment shows the connected devices as computers, such illustration is merely exemplary and may comprise various computing devices such as handheld devices, multi-processor systems, microprocessor based or programmable consumer electronics, network PCs, minicomputers, mainframe computers, and the like. Moreover, communications network 160 may itself comprise a number of computers and network devices such as routers and the like, which also may be capable of hosting objects 10 and/or providing services to objects 10.

There are a variety of systems, components, and network configurations that support distributed computing environments. For example, computing systems may be connected together by wireline or wireless systems, by local networks or widely distributed networks. Currently, many of the networks are coupled to the Internet which provides the infrastructure for widely distributed computing and encompasses many different networks.

The exemplary computing devices 20a-20c, 21a-21c of FIG. 2 are displayed as physically separated for purposes of ease of explanation, but one skilled in the art will appreciate that multiple computer processes 10a-10n can coexist on a single machine, through memory partitions, virtual machines, or similar programming techniques allowing one physical computing structure to perform the actions described below as attributed to multiple structures.

Components of computer devices 20a-20c, 21a-21c may include, but are not limited to, a processing unit, a system memory, and a system bus that couples various system components including the system memory to the processing unit. The components of computer devices 20a-20c, 21a-21c are described more fully below in connection with FIG. 6.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

State Machine Approach

An elegant mechanism for implementing a distributed system is on in which a collection of clients (e.g., 20a-20c) issue commands to a single server (e.g., 21a). The server can be described as a deterministic state machine that performs client commands in some sequence. The state machine has a current state; it performs a step by taking as input a command and producing an output and a new state. For example, the clients of a distributed banking system might be tellers, and the state machine's state might consist of the account balances of all users. A withdrawal would be performed by executing a state machine command on the server (e.g., 21) that decreases an account balance if and only if the balance is greater that the amount withdrawn, producing as output the old and new balances.

An implementation that uses a single central server fails if that server fails. To combat the failure point, a collection of servers can be used (e.g., 21a-21c), each server, independently implementing a state machine. Because the state machine is deterministic, all of the servers will produce the same sequence of states and outputs if they all execute the same sequence of commands. A client issuing a command can then use the output generated for it by any server.

To guarantee that all servers execute the same sequence of state machine commands, a lead process (e.g., lead server) is selected. The lead process may be selected by a variety of mechanisms such as by consensus of other servers, randomly, computing load based, etc. Clients then send commands to the lead process, which decides where in a sequence of commands each command should appear. The leader then distributes the command number to the other servers in the distributed system. By executing the same sequence of commands, all of the servers 21a-21c then have the same state.

Figure 3:
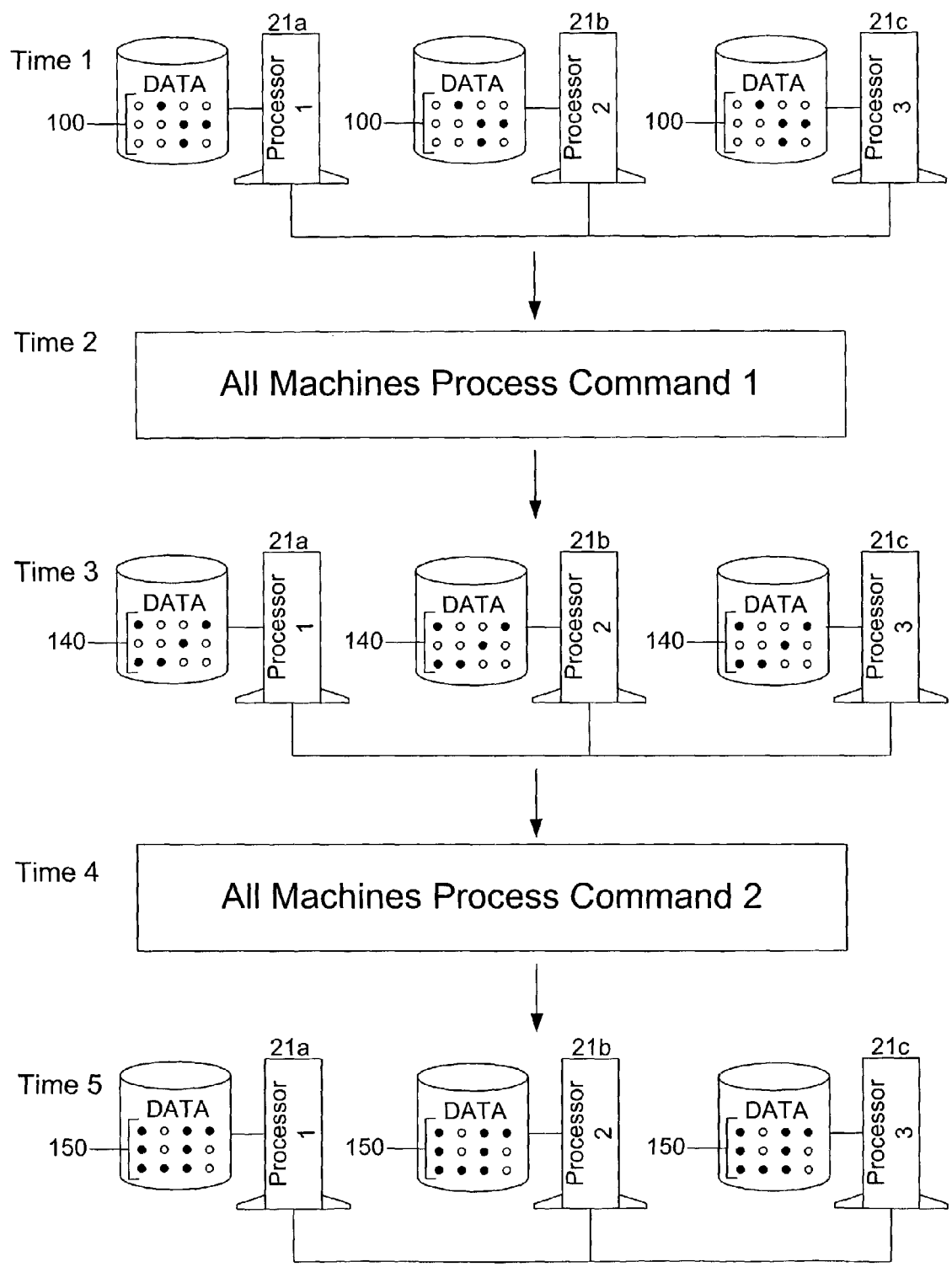
FIG. 3 represents a state machines approach to ensuring that a set of servers remain synchronized.

FIG. 3 represents a state machines approach to ensuring that a set of servers remain synchronized. Servers 21a-21c start at a predefined initial data state 100 that is synchronized with the data state of other servers 21a-21c. Data 100 remains synchronized with the data of other connected state machines so long as no commands are executed by any server 21a-21c upon the data or so long as each server 21a-21c processes the same commands in the same sequence upon the data. The term commands is used herein to represent an instruction or set of computer instructions that are performed atomically on the data associated with the server, e.g., by the execution of a program, process, method, query, etc.

At time 1 all of the servers 21a-21c begin with the data in the same state 100. At time 2, all of the servers 21a-21c process the identical command 1. At time 3, after executing command 1, all of the servers move their respective data sets to state 140. At time 4, all machines process command 2. At time 5, after processing command 2, all of the servers move their respective data sets to state 150. Of course, the illustration shows that conceptually the servers remain synchronized by moving from state to state in the time sequence 1-5. However, by ordering and distributing commands from a lead process, the actual physical time that a command is executed at a physical server may vary among the various servers, that is the servers may actually move between states asynchronously as observed with respect to a clock external to the system. Nevertheless, the state machine mechanism guarantees that each server will be in the same state and give the same output for a given input for any ordered command.

Multiple Lead Servers

Figure 4:
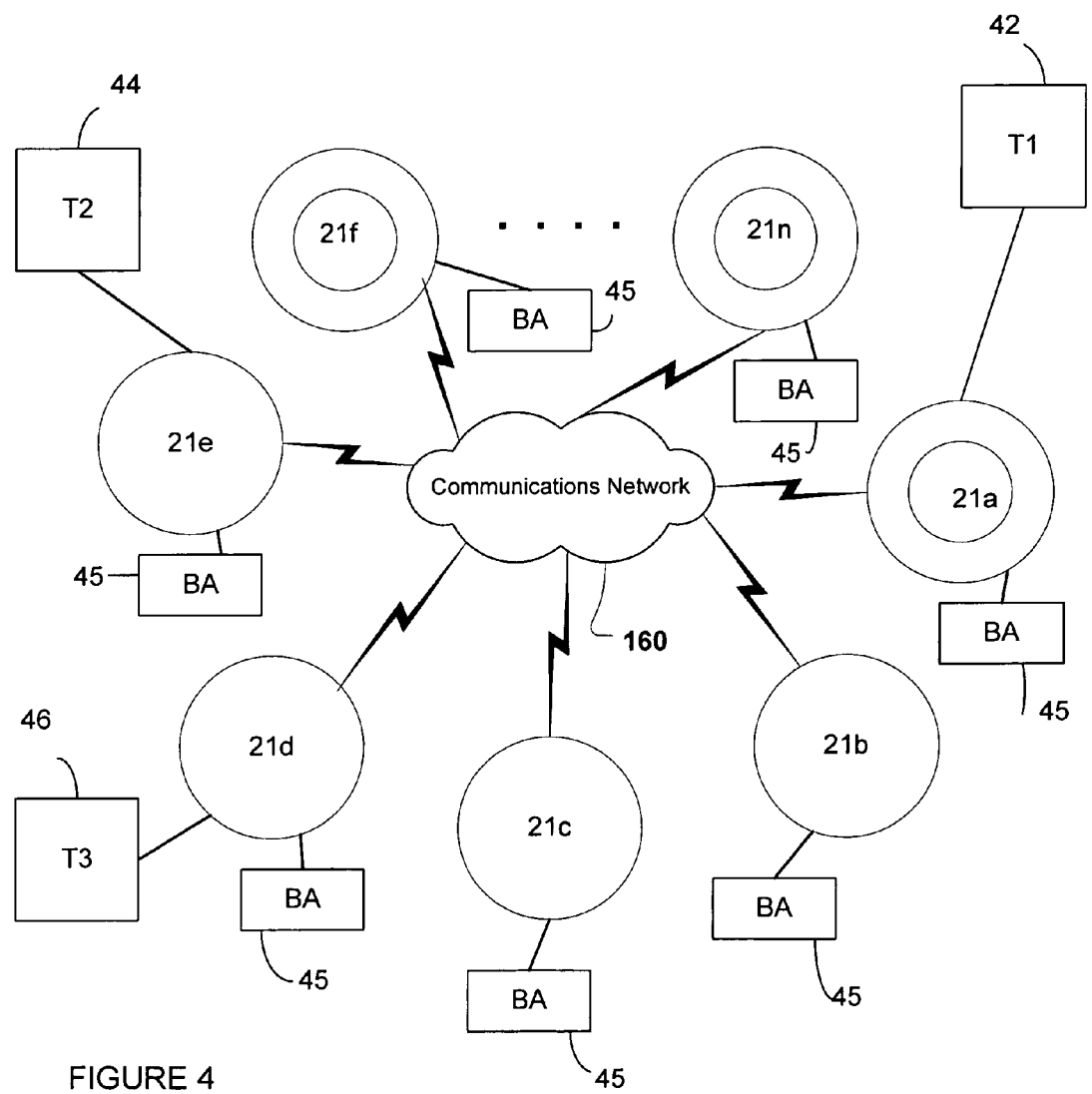
FIG. 4 illustrates an aspect of the invention wherein a bottleneck can be relieved by assigning multiple lead processes.

Using a single process as a leader on a single server, e.g., 21a, presents a bottleneck to processing of commands in the distributed computing system described. The primary cause of the bottleneck is that all commands must be assigned a command sequence number by the lead process. FIG. 4 illustrates an aspect of the invention wherein the bottleneck can be relieved by assigning multiple lead processes (e.g., server, 21a, 21f-21n). The lead processes are depicted by a double-ringed circle and the regular processes are depicted by a single ring circle. N-processes are assigned as lead processes, where each of the lead processes are capable of ordering a set of commands to be processed by all of the servers in the distributed system.

There is no theoretical limit to the number of processes that may be considered leaders, aside from the number of processes connected to the network. Practically, the number of lead process should be selected to maximize the system response while minimizing the number of messages communicated in the system. The lead processes perform the role of orchestrating the command sequences for all or any portion of the other connected processes/servers. This role may include but is not limited to: 1. Receiving new information from the computers and devices of the network; 2. Processing the information to determine what commands should be sent out to the other connected processes; 3. Assigning command sequence numbers to the commands; and 4. Sending the sequenced commands out to the other connected processes as necessary.

Any process with adequate computing and storage capacity to fulfill the leader role may be a leader. The designer of the network may predetermine leaders, or there may be a process in place allowing the network to determine its own leaders as necessary. For instance, if a leader crashes, the other processes in the network may have a means of appointing a new leader to that role.

Non-lead (i.e. regular) processes in the network (e.g., $21b$-$21e$) may decide which leader to send new information to based on any number of techniques. Each individual device may have a single leader that it always sends its new information to, or devices may decide which leader to send new information based on the quantity or quality of new information that it is sending. Devices may also simply rotate through all of the available leaders, sending new information first to one leader, then to the next and so on. Devices may have a random process for determining which leader to send to. Devices may also use a formula that accounts for such factors as traffic to the various leaders, computing power of the leaders, and proximity of a given leader to the sending device. The above list is demonstrative of the many ways the networked devices may determine which leader to send new information to. Those skilled in the art will appreciate that the formula used to determine which leader is sent new information may be adapted to the needs of a given network as necessary.

The leaders $21a$, $21f$-$21n$ may use any number of methods to partition the sequence numbers among themselves. For example, the sequence numbers may be partitioned randomly, based on some function such as a multiplier (e.g., every third number), divided into groups (e.g., first ten numbers to first leader, second ten numbers to the second leader, and so on). The use of "number" in sequence number is used in the generic sense and could encompass indicators other than pure number, e.g., letters. The sequence number may be indicated by whole integers (1, 2, 3, 4, etc.), multiples of integers (2, 4, 6, 8, etc.), the alphabet (a, b, c, d, etc.), a clock (4:58, 4:59, 5:00, 5:01, etc.), or any other method of creating an ordered sequence.

To avoid command sequence assignment conflicts between multiple leaders $21a$, $21f$-$21n$, each leader is allowed a separate set of command sequence numbers. For example in a two leader system wherein $21a$ and $21f$ are leaders, leader $21a$ is given command sequence numbers 1, 3, 5, 7, etc. while leader $21f$ is given command sequence numbers 2, 4, 6, 8, etc. Sequence numbers may be distributed according to any function that distributes command sequences in a non-conflicting manner. Leader $21a$ might, for example, be programmed to assign sequence numbers 1, 2, 3, 5, 6, 7, 9, 10, etc. while leader $21f$ is programmed to assign sequence numbers 4, 8, 12, 16, etc. The sequence numbers given to each leader could also, for example, be based on a function that accounts for the amount of traffic each leader is handling. Again, those skilled in the art will appreciate that the function used to determine the set of sequence numbers assigned to each leader may be adapted to the needs of a network as necessary.

In one embodiment, those processes $21a$-$21n$ (the leaders may also server the role of a regular process) of the network that execute the sequenced commands are programmed to execute the commands in sequence, which is not necessarily the order that commands are received. If leader $21a$ sends out commands 1, 3, 5, and 7 before leader $21f$ sends out command 2, the processes $21a$-$21n$ will simply execute command 1 and wait for command 2. When the processes $21a$-$21n$ receive command 2, they will execute command 2 and then command 3 (because they had already received command 3). This solves the problem of timing irregularities between commands coming from multiple leaders. No matter when the commands from various leaders arrive, all processes $21a$-$21n$ will maintain synchronization: they will perform the same command operations in the same sequence. Synchronization of the processes $21a$-$21n$ could also be based on some system for rearranging the sequenced commands, so long as each synchronized process $21a$-$21n$ rearranges the commands in the same way.

In the case of long delays between commands in a multi-leader system, the processes of the network $21a$-$21n$ could be forced to wait too long for commands to issue from one of the leader. For example, consider a three-leader situation $21a$, $21f$, $21n$ where leader $21a$ has sequence numbers 1, 4, 7, etc., leader $21f$ has sequence numbers 2, 5, 8, etc., and leader $21n$ has sequence numbers 3, 6, 9, etc. If leaders $21a$ and $21n$ send out commands (e.g., 1, 4 and 2, 6, respectively), but leader $21f$ does not have a command to send, due to not having received new information or any other reason, the other processes $21a$-$21n$ would be greatly delayed by leader $21n$ not sending out a command. The processes would be unable to proceed.

The above dilemma can be solved by the empty, or "no-op" command. When a leader does not have commands to send, and as a result commands from other leaders are delayed, the leader can recognize the delay (e.g., by virtue of having received the commands from leader $21a$ and $21n$). The leader can then generate a no-op command to complete the sequence and allow the processes to complete the execution of commands. Such a command will utilize the missing sequence number. Upon receipt of a no-op command with the appropriate sequence number, the other processes can process the no-op (which does not change the data state of a state machine) and then move on to the other issued commands. In the situation above, leader $21f$ would send out no-op commands with sequence numbers 3,5. The other processes, programmed to execute commands in sequence, would then process the no-op commands at their respective places in the sequence and move on to subsequent commands.

Example Use of Multi-leader Process

FIG. 4 further illustrates aspects of the invention. For this example, teller machines T1-T3, 42-46, respectively are bank teller machines located at geographically disparate locations. Similarly, processes $21a$-$21n$ are hosted by server computers also located at various disparate locations. Teller machine 42 is associated with process $21a$, which also servers as a lead process (as designated by the double ring). Teller machine 44 is associated with process $21e$ and teller 46 is associated with process $21d$. A user bank account 45 is replicated at maintained at each server process $21a$-$21n$. Accordingly, the user can access the bank account information at any one of servers $21a$-$21n$. Additionally, a user account may be accessed substantially simultaneously from the various teller machines 42, 44, 46. The system of FIG. 4 illustrates how the multi-leader system aids in maintaining a consistent state among the various replicas of user bank account 45. Of course, this could be accomplished by a single leader. Nevertheless as more users are added to the system, a single leader system will prove to be a bottleneck as discussed above.

Figure 5:
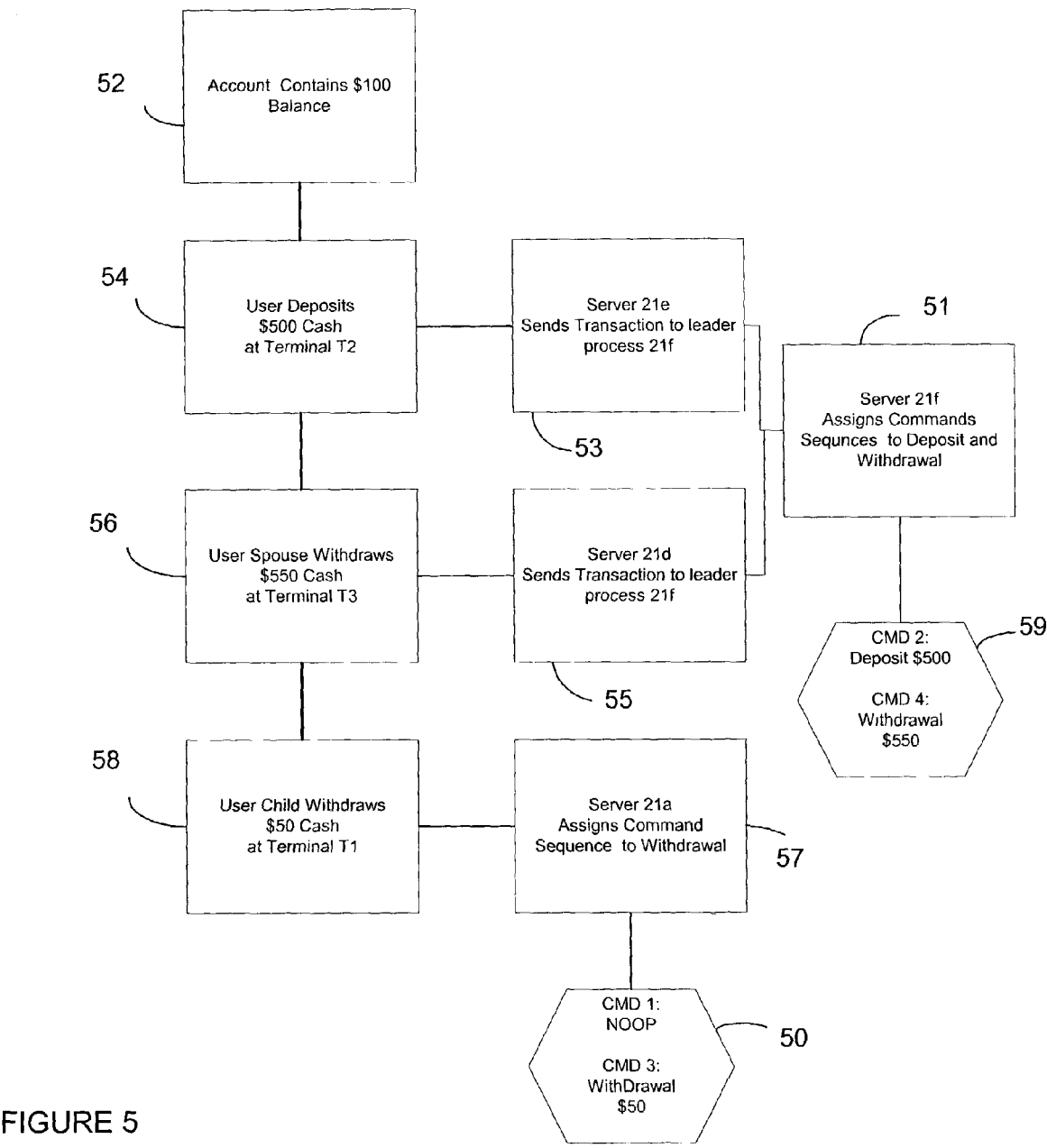
FIG. 5 illustrates a sequence of events in the distributed system of FIG. 4.

FIG. 5 illustrates the sequence of events in the distributed system of FIG. 4 based on the above example. First at step 52, the user account has an initial state of $100. Accordingly, all of the server processes 21a-21n have the initial state of $100 as the account balance. At step 54, the user makes a deposit of $500 cash at terminal T2 44. At step 56, the user's spouse makes a withdrawal of $550 from terminal T3 46. At step 58, the user's child makes a withdrawal of $50 from terminal T1 42. This example assumes that the user events were processed in that order by the various terminals. At step 53, server 21e sends the event to leader 21f to request a command number. Server process 21e recognizes leader 21f in accordance with the description for assigning leaders above. At step 55, server process 21d also sends its event to leader 21f to request a command number. At step 57, server 21a is a leader and thus does not send the event to another leader. At step 51, server 21f assigns command numbers to the events reported in steps 53 and 55 and issues commands 2 and 4 to all of the servers in the distributed computing system. At step 50, if server 21a has already received command 2 from server 21f, command 1 is issued as a NO-OP. Command 3 is issued from server 21a to all of the server processes 21a-21n. All of the servers then execute the commands in order and thereafter reflect the same state.

Of course, there is the potential for a race condition depending on when commands are received and assigned a sequence number by the various lead processes. That is people generally consider that an event a occurred before an event b if it occurred earlier in time. This may have some truth in terms of physical time. However, the events here are ordered in terms of how the are observable from the system. This is likely sufficient for many applications such as banking wherein users do not expect events to be clocked to fractions of a second.

Figure 6:
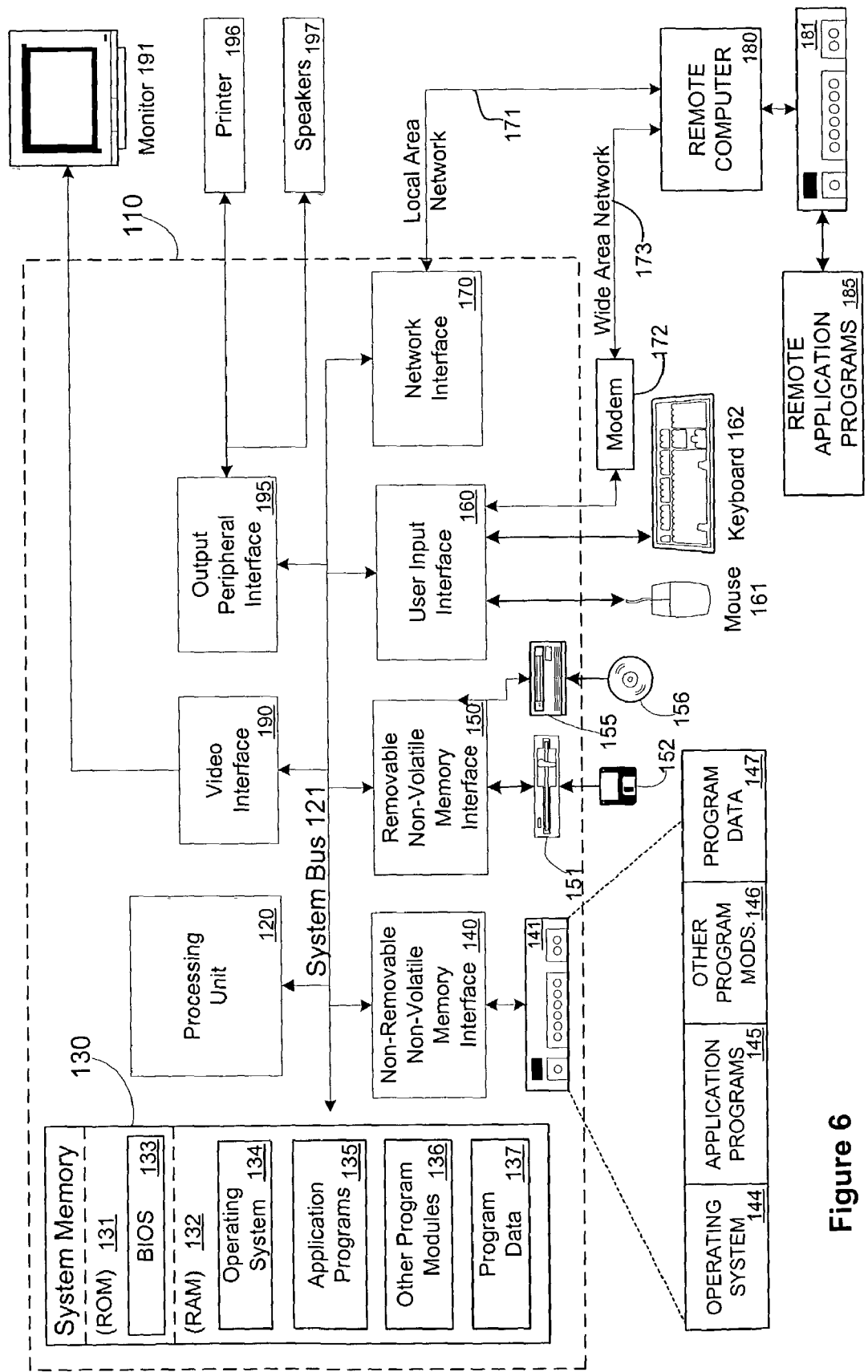
FIG. 6 depicts an exemplary system for implementing a general-purpose computing device.

The computing devices described above can be implemented on a general-purpose computing device. FIG. 6 depicts an exemplary system for implementing a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

Computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices may include a microphone 163, joystick, game pad, satellite dish, scanner, or the like (not shown). These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video, recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices such as personal computers and PDAs, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed:

1. A distributed computer system, comprising:
   a plurality of processes each having an associated set of data;
   a first lead process in communication with the plurality of processes wherein the first lead process communicates a first command sequence number and a value indicative of a command associated with the first command sequence to the plurality of processes;
   a second lead process in communication with the plurality of processes wherein the second lead process communicates a second command sequence number different from the first command sequence number of the other lead process and a value indicative of a command associated with the second command sequence;
   each process in the plurality of processes programmed to receive the command sequence numbers and values indicative of the commands associated with the command sequences from the first lead process and the second lead process and to execute the commands in a predefined order.

2. The system as recited in claim 1, wherein one of the first and second lead processes is selected from the plurality of processes.

3. The system as recited in claim 1, wherein the first and second lead processes communicate commands associated with sequence numbers to the plurality of processes.

4. The system as recited in claim 1, wherein the plurality of processes receive commands and communicate the commands to one of the first lead process or the second lead process.

5. The system as recited in claim 4, wherein the first and second lead processes occasionally assign a command sequence number to a no-op command.

6. The system as recited in claim 4, wherein the occasion for assigning a command sequence to a no-op command is based on the lack of commands received from the plurality of processes for a predetermined period of time.

7. The system as recited in claim 1 wherein the plurality of processes are hosted by separate computer devices.

8. The system as recited in claim 1 wherein the command sequences are numbers.

9. The system as recited in claim 1 wherein the command sequences are time-based.

10. A method for assigning a command sequence in a network of connected computer processes, comprising:

providing at least two processes from a network of connected processes to serve as lead processes; each lead process determining different command sequence numbers, than the command sequence numbers determined by the other lead processes, to assign to commands to be executed by the connected processes;

wherein the command sequence numbers place a deterministic execution order on a set of commands to be executed by the connected processes; and distributing the command sequence numbers to the connected processes as an indication of the execution or of the set of commands, whereby all of the connected processes execute the commands in the same order.

11. The method of claim 10 wherein the command comprises at least one computer-executable instruction.

12. The method of claim 10 wherein the command sequence numbers comprise an ordered set of numbers.

13. The method of claim 12 wherein the command sequence numbers used by one lead process are different from the command sequence numbers used by the other lead processes.

14. The method of claim 10 wherein the command sequence numbers comprises a time component.

15. The method of claim 10 further comprising sending sequenced commands to all of the connected processes.

16. The method of claim 10 further wherein the connected processes send receive commands to a lead process for assignment of a command sequence.

17. A computer-readable storage medium bearing computer readable instructions for assigning a command sequence in a network of connected computer processes, comprising:

a first process for determining command sequence numbers to assign to commands to be executed by connected processes in a system wherein the command sequence numbers place a deterministic execution order on a set of commands to be executed by the connected processes and wherein at least one other process assigns different command sequence numbers, than the command seauence numbers determined by the first process, to commands to be executed;

distributing the command sequence numbers to the connected processes as an indication of the execution order of the set of commands, whereby a plurality of the connected processes execute the commands in the same order.

18. The computer-readable medium of claim 17 wherein the command comprises at least one computer-executable instruction.

19. The computer-readable medium of claim 17 wherein the command sequences comprise an ordered set of numbers.

20. The computer-readable medium of claim 19 wherein the numbers are different from the numbers used by the other processes that is assigning command sequence numbers.

21. The computer-readable medium of claim 17 wherein the command sequences comprise a time component.

22. The computer-readable medium of claim 17, further comprising sending sequenced commands to all of the connected processes.

23. The computer-readable medium of claim 17 further comprising receiving commands from connected processes for assignment of a command sequence number.

* * * * *